(12) United States Patent
Fuchiwaki

(10) Patent No.: US 8,363,524 B2
(45) Date of Patent: Jan. 29, 2013

(54) INFORMATION REPRODUCING APPARATUS AND INFORMATION REPRODUCING METHOD

(75) Inventor: Atsushi Fuchiwaki, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 645 days.

(21) Appl. No.: 11/625,402

(22) Filed: Jan. 22, 2007

(65) Prior Publication Data

US 2007/0280074 A1 Dec. 6, 2007

(30) Foreign Application Priority Data

Jun. 6, 2006 (JP) .................................. 2006-157235

(51) Int. Cl.
G11B 20/00 (2006.01)
G11B 7/00 (2006.01)
G11B 20/18 (2006.01)

(52) U.S. Cl. ................. 369/53.1; 369/44.27; 369/53.28

(58) Field of Classification Search ........................ None
See application file for complete search history.

(56) References Cited

U.S. PATENT DOCUMENTS

2001/0017822 A1* 8/2001 Aso et al. ......................... 369/32
2004/0076084 A1* 4/2004 Yonezawa .................... 369/30.1

FOREIGN PATENT DOCUMENTS

JP 09-288883 11/1997
JP 2001-266486 9/2001
JP 2001-297445 10/2001

* cited by examiner

Primary Examiner — Mohammad Ghayour
Assistant Examiner — Carl Adams
(74) Attorney, Agent, or Firm — Antonelli, Terry, Stout & Kraus, LLP.

(57) ABSTRACT

According to the present invention, even if tracking fails during reproduction of information from an optical disk and a movement is made to an adjoining track, the reliability of data to be transferred is improved and a countermeasure can be taken immediately. An unrecorded area decision unit decides based on the amplitude of a reproduction signal whether a block concerned is a recorded area or an unrecorded area. A track-off detection unit monitors a tracking servo signal, detects occurrence of a tracking failure, and registers a block, which is recognized as an area where the tracking failure has occurred. If the block is an unrecorded area and recognized as an area where a tracking failure has occurred, reproduction is ceased but data signifying that the block is an unrecorded area is not transferred to an upper-level system and retry is performed to achieve reproduction.

8 Claims, 3 Drawing Sheets

INFORMATION REPRODUCING APPARATUS AND INFORMATION REPRODUCING METHOD

CLAIM OF PRIORITY

The present application claims priority from Japanese application serial No. JP 2006-157235 filed on Jun. 6, 2006, the content of which is hereby incorporated by reference into this application.

BACKGROUND OF THE INVENTION (1) Field of the Invention

The present invention relates to an information reproducing apparatus and an information reproducing method capable of reading information recorded on an optical disk without an error.

(2) Description of the Related Art

For accurate reproduction of information from an optical disk, not only information on identification of read data but also information on the position (address) thereof should be correct. When user data is recorded in each block on a digital versatile disk (DVD) or Blu-Ray disk (BD), information on the address (position) of the block is also recorded. When data is reproduced from a recorded block, an address (DID) specified in the recorded data is referenced in order to check whether the address of the block is correct. No problem therefore takes place. However, when no data is recorded in a block, an address (DID) is also left unrecorded. The address cannot therefore be referenced. For identifying an address of an unrecorded area on an optical disk, technologies described below are adaptable.

(1) For the DVD±R/RW formats, there is a technology for managing the positions of blocks on an optical disk, which have data left unrecorded, using an unrecorded block management area on the disk. When a disk drive is instructed an address, from which information is reproduced, by a host, the disk drive references management information so as to decide whether the instructed block has data recorded or left unrecorded (refer to, for example, Japanese Patent Laid-Open No. H9-288883).

(2) For the DVD-RAM format, pre-pits that represent an address are formed in an optical disk in advance. When an address reading ability is improved, even the address of an unrecorded block can be correctly read by checking the pre-pits (refer to, for example, Japanese Patent Laid-Open No. 2001-297445).

(3) For the DVD±R/RW formats and BD-R/RE formats, address information is recorded by forming a wobbling groove in a disk so that the address of each block can be learned even with data left unrecorded (refer to, for example, Japanese Patent Laid-Open No. 2001-266486).

SUMMARY OF THE INVENTION

However, as far as BDs are concerned, neither (1) the area where unrecorded blocks are managed is included nor (2) the pre-pits are formed therein. Only the (3) address information represented by a wobbling groove can be utilized. However, compared with the ability to read recorded data, the ability to read identity (ID) information by checking the wobbling groove is so low that the ID information represented by the wobbling groove may not be read accurately. In such a case, once an address is read accurately, it is stored. For subsequent blocks, address information is interpolated and then corrected.

According to the BD-R/RE formats, information to be used to manage unrecorded blocks is not produced. When information is reproduced from a block concerned, whether the block is a recorded or unrecorded area is decided based on the level of a radiofrequency signal. If the block is an unrecorded area, data 00 is reported (transferred) to a host. Consequently, while information is reproduced from a BD-R/RE disk, a movement may be made to an adjoining track by mistake. Assuming that a block to which a movement is made is an unrecorded area and address information represented by a wobbling groove cannot be read, the address information represented by the wobbling groove is interpolated by mistake (although a movement is made to the adjoining track by mistake, an address is not corrected). As a result, the fact that a movement is made to the adjoining track is left unaware, and the block is recognized as an unrecorded block. Consequently, data 00 is erroneously transferred to the host. Thus, the reliability of the address (ID) of an unrecorded block is so low that it must be improved.

As countermeasures, methods described below are conceivable.

(a) Assuming that an address is interpolated because an address represented by a wobbling groove cannot be read, deciding whether a block concerned is an unrecorded area is suspended. When the address represented by the wobbling groove is read, if it is confirmed that a movement to an adjoining track is not made and that there is no problem, data in or concerning the block for which making a decision is suspended is transferred to a host.

(b) A tracking servo signal is monitored in order to learn occurrence of a movement to an adjoining track (a track-off event) If a movement to an adjoining track occurs, reproduction is ceased and retry is performed. According to the countermeasure (a), whether a block is an unrecorded area cannot be decided until an address represented by a wobbling groove in a disk can be read. For disks from which information represented by a wobbling groove is hard to read, it takes a very long time to make a decision. According to the countermeasure (b), when a disk suffers a defect or the like, a track-off event may be incorrectly recognized because of the defect. Reproduction may then be suspended and unnecessary retry may be forcibly performed. Both the methods require a long time until a correct address is identified and data is reported. Reproduction is requested to be speeded up.

An object of the present invention is to improve the reliability of data to be transferred and speed up reproduction even when tracking fails during reproduction of information from an optical disk and a movement is made to an adjoining track.

The present invention provides an information reproducing apparatus that reproduces information from an optical disk and transfers the information to an upper-level system. The information reproducing apparatus includes: a spindle motor that rotates the optical disk; a pickup that reproduces information from the optical disk; a reproduction circuit that handles a reproduction signal sent from the pickup; a servo circuit that controls the rotation of the spindle motor and the movement of the pickup; and a microprocessor that controls the reproduction performed by the pickup via the reproduction circuit and servo circuit, and controls the transfer of information, which is reproduced from the optical disk, to the upper-level system. The microprocessor includes: an unrecorded area decision unit that decides based on the amplitude of the reproduction signal whether a block concerned is a recorded area or an unrecorded area; a track-off detection unit that monitors a tracking servo signal sent from the servo circuit and detects occurrence of a tracking failure; and a track-off block memory unit in which positional information on a block which the track-off detection unit is recognized as an area where a tracking failure has occurred is recorded. When a block concerned is an unrecorded area and is recognized as an area where a tracking failure has occurred, reproduction is ceased but data signifying that the block is an unrecorded area is not transferred to the upper-level system and retry is performed to achieve reproduction.

If the track-off detection unit detects occurrence of a tracking failure, information on a block recognized as an area where the tracking failure has occurred is recorded in the track-off block memory unit, and reproduction is continued.

If a block concerned is a recorded area, an address is acquired from reproduced data. If the address agrees with an intended address, the reproduced data is transferred to the upper-level system irrespective of information on the block recognized as an area where a tracking failure has occurred which is recorded in the track-off block memory unit.

Moreover, the present invention provides an information reproducing method for reproducing information from an optical disk and transferring the information to an upper-level system. According to the information reproducing method, a tracking servo signal is monitored during information reproduction. A block recognized as an area where a tracking failure has occurred is registered in a track-off block memory unit. Based on the amplitude of a reproduction signal, whether the block is a recorded area or an unrecorded area is decided. If the block is an unrecorded area, the track-off block memory unit is referenced. If the block is recognized as an area where a tracking failure has occurred, reproduction is ceased but data signifying that the block is an unrecorded area is not transferred to the upper-level system and retry is performed to achieve reproduction.

According to the present invention, the reliability of information to be reproduced from an optical disk is improved and reproduction is speeded up.

BRIEF DESCRIPTION OF THE DRAWINGS

Exemplary embodiment of the present invention will be described in detail based on the following figures, wherein.

DESCRIPTION OF THE PREFERRED EMBODIMENT

Figure 1:
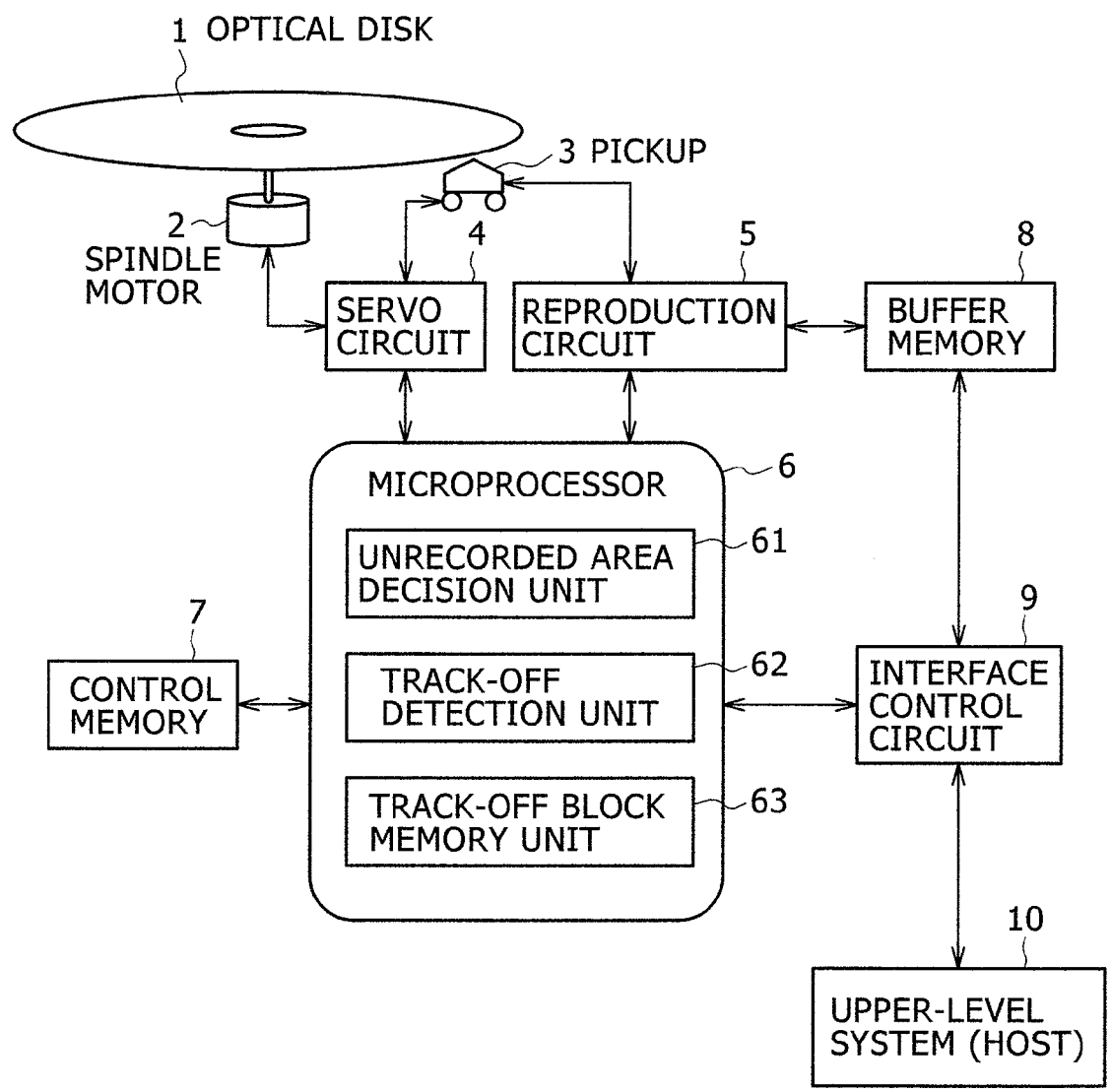
FIG. 1 is a block diagram showing the configuration of an optical disk drive that is an embodiment of an information reproducing apparatus in accordance with the present invention.

FIG. 1 is a block diagram showing the configuration of an optical disk drive that is an embodiment of an information reproducing apparatus in accordance with the present invention. An optical disk 1 such as a BD is rotated at a predetermined rotating speed by a spindle motor 2. A pickup 3 includes a laser light source, a photodetector, and an optical lens system, and irradiates laser light to the optical disk 1 so as to reproduce information (data). A servo circuit 4 controls the rotation of the spindle motor 2 and the position of the pickup 3 in a direction of the radius of the disk, and thus controls a tracking direction and a focusing direction. A reproduction circuit 5 performs reproduction, which includes binary-coding, demodulation, decoding, and error correction, on a signal read by the pickup 3. Reproduction data is temporarily stored in a buffer memory 8, and transferred to an externally connected upper-level system (host) 10 such as a personal computer via an interface control circuit 9. In response to a command sent from the upper-level system 10, a microprocessor 6 controls the servo circuit 4, reproduction circuit 5, and interface control circuit 9, and thus controls various pieces of processing including reproduction. A control memory 7 holds programs and data needed for control.

In the present embodiment, the microprocessor 6 controls an access sequence to be followed by the pickup 2. Moreover, the microprocessor 6 detects a tracking error, decides whether a block concerned is a recorded or unrecorded area, and reads address information represented by a wobble signal that is the pattern of a wobbling groove. An unrecorded area decision unit 61 decides based on the amplitude of a read signal whether a block concerned is a recorded or unrecorded area. A track-off detection unit 62 monitors a tracking servo signal so as to detect occurrence of a tracking failure (which hereinafter will be called a track-off). However, the track-off detection unit 62 may erroneously detect a track-off because of a defect (flaw) or the like on a disk. A track-off block memory unit 63 holds positional information on a block which the track-off detection unit 62 has recognized as an area where a track-off has occurred.

During reproduction performed according to the present embodiment, the track-off detection unit 62 monitors a tracking servo signal to detect a track-off. When a track-off is detected, information on a block recognized as an area where a track-off has occurred is recorded in the track-off block memory unit 63, and reproduction is continued. When reproduction from the block recognized as an area where a track-off has occurred is completed, if the block is a recorded area, a data ID (DID) contained in recorded data is checked in order to obtain an address. If the address is correct (the address agrees with an intended address), the data read from the block is transferred to the upper-level system 10 irrespective of the recorded information on the block recognized as an area where a track-off has occurred. If the block is an unrecorded area and recognized as an area where a track-off has occurred, reproduction is ceased. Retry is performed but data 00 signifying that the block is an unrecorded area is not transferred to the upper-level system 10. Consequently, the frequency of erroneously recognizing a block as an unrecorded area because of a track-off is reduced, and the number of retries derived from erroneous recognition due to a track-off is decreased.

If retry provides the same result of recognition (a block concerned is an unrecorded area and recognized as an area where a track-off has occurred), a wait state is maintained until an address represented by a wobble signal is read. Otherwise, a decision is made that a track-off is erroneously recognized due to a defect on the disk, and data 00 is transferred.

In the present embodiment, as mentioned above, information on a track-off and information on an unrecorded block are used in combination, and the result of reading is reported to the upper-level system. For comparison, a conventional reading procedure will be described below.

Figure 3:
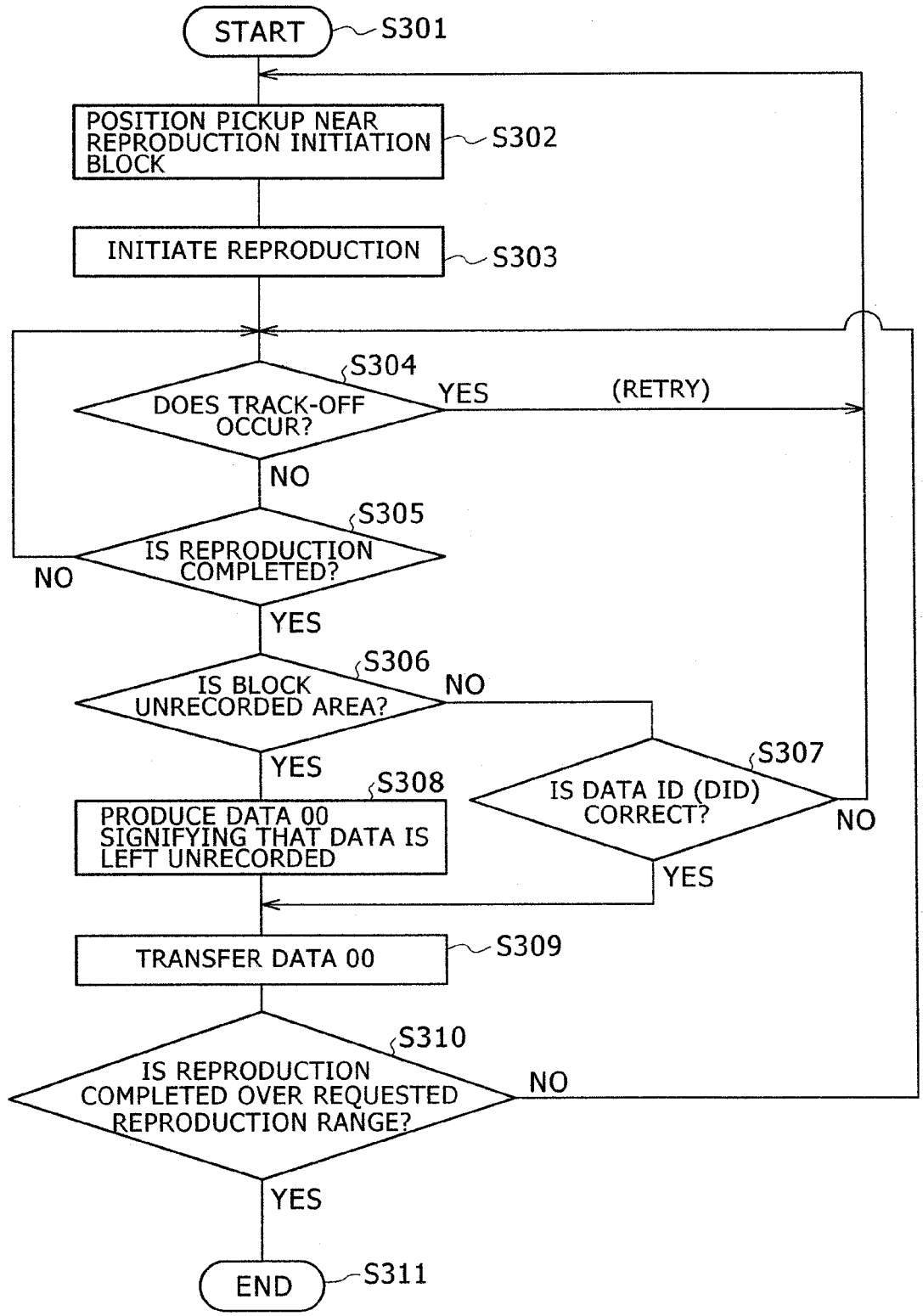
FIG. 3 is a flowchart describing a conventional procedure of information reproduction from an optical disk.

FIG. 3 is a flowchart describing a conventional procedure of information reproduction from an optical disk. When a reproduction command is received from the host 10, the pickup 3 is positioned near a block from which information is reproduced (S302). Reproduction of information from the intended block is then initiated (S303). At this time, the track-off detection unit 62 receives a tracking servo signal from the servo circuit 4, and detects whether a track-off has occurred (S304). If occurrence of a track-off is recognized (YES at S304), retry is initiated. Control is then returned to step S302, and reproduction of information from an intended block is resumed. If occurrence of a track-off is not detected (NO at S304), reproduction is continued as it is in order to complete reproduction of information from the block (S305).

Thereafter, the unrecorded area decision unit 61 decides based on the level of a radio frequency reproduction signal whether the block is a recorded area or an unrecorded area (S306). If the block is a recorded area (NO at S306), a data ID (DID) that is address information contained in recorded data is read. Whether the data ID is correct (that is, whether the data ID agrees with an intended address) is then decided (S307). If the data ID is incorrect (NO at S307), the read position is erroneous. Control is then returned to step S302, and reproduction is resumed. If the data ID is correct (YES at S307), data read from the block is transferred to the host (S309).

On the other hand, if the block is recognized as an unrecorded area at step S306, data 00 signifying that data is left unrecorded is produced (S308), and transferred to the host as it is (S309). Thus, reproduction of data from a requested range is completed (S310).

According to the foregoing procedure, a tracking servo signal is monitored. If a track-off occurs, reproduction is ceased and retry is performed. However, occurrence of a track-off may be erroneously recognized due to a defect (flaw) on a disk. Unnecessary retry may be forcibly performed (S304). Moreover, a movement to an adjoining track may be left unaware, a block concerned may be recognized as an unrecorded area, and data 00 may be erroneously transferred to the host (S306, S308, and S309).

Figure 2:
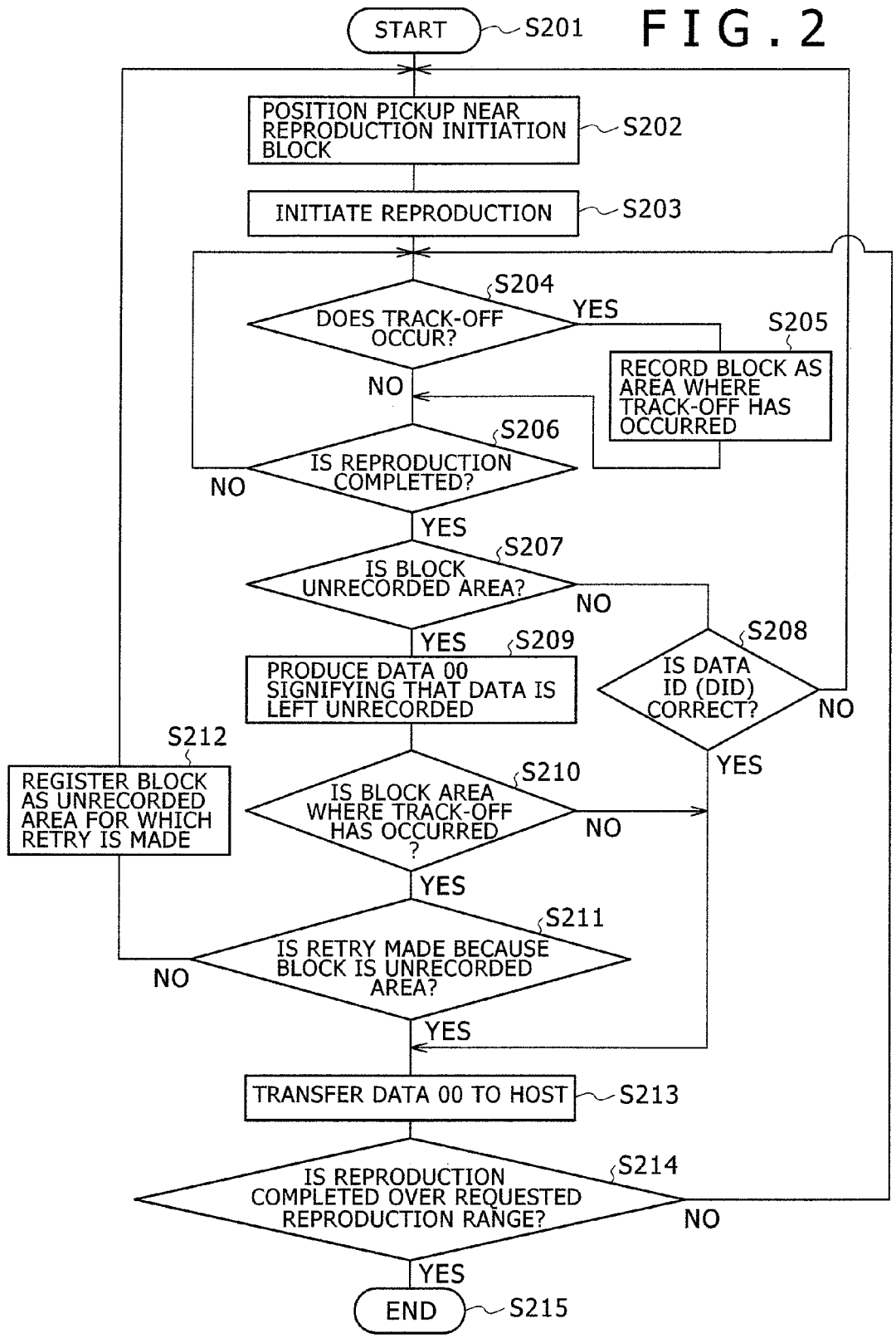
FIG. 2 is a flowchart describing a procedure of information reproduction from an optical disk in accordance with the present invention.

FIG. 2 is a flowchart describing a procedure of information reproduction from an optical disk in accordance with the present invention. In response to a reproduction command sent from the host 10, the pickup 3 is positioned near a block from which information is reproduced (S202). Reproduction of information from an intended block is then initiated (S203). The track-off detection unit 62 receives a tracking servo signal from the servo circuit 4, and detects whether a track-off has occurred (S204) If occurrence of a track-off is recognized (YES at S204), information on a block recognized as an area where the track-off has occurred is recorded in the track-off block memory unit 63. Reproduction is continued (S205). If occurrence of a track-off is not detected (NO at S204), reproduction is continued as it is in order to complete reproduction of information from the block (S206).

Thereafter, the unrecorded area decision unit 61 decides based on the level of a radio frequency reproduction signal whether the block is a recorded area or an unrecorded area (S207). If the block is a recorded area (NO at S207), a data ID (DID) that is address information contained in recorded data is read. Whether the data ID is correct (whether the data ID agrees with an intended address) is decided (S208). If the data ID is incorrect (NO at S208), the read position is erroneous. Control is then returned to step S202 and reproduction is resumed. If the data ID is correct (YES at S208), data read from the block is transferred to the host (S213).

On the other hand, if the block is recognized as an unrecorded area at step S207, data 00 signifying that data is left unrecorded is produced (S209). However, transfer of data 00 to the host is suspended. The track-off block memory unit 63 is then referenced to decide whether the block is an area where a track-off has occurred (S210). If the block is not an area where a track-off has occurred, data 00 signifying that the block is an unrecorded area is transferred to the host (S213). If the block is an area where a track-off has occurred (yes at S210), retry is performed because data in the block is not intended data. A decision is made on whether retry has been performed because the block is an unrecorded area (S211). If the retry has not been performed (NO at S211), the block is registered as a block for which retry has been performed because the block is an unrecorded area. Control is then returned to step S202 and reproduction is resumed. If retry has already been performed because the block is an unrecorded area (YES at S211), data 00 signifying that the block is an unrecorded area is transferred to the host (S213). Thus, reproduction of data is completed over a requested range (S214).

According to the information reproducing method of the present embodiment, if a block is recognized as an unrecorded area, track-off information is referenced. If tracking succeeds, data 00 is transferred to the host (S210 and S213). Therefore, an incident that data 00 is incorrectly transferred to the host when a movement is made to an adjoining track will not take place. If occurrence of a track-off is detected, information on the occurrence is temporarily recorded, and reproduction is continued. Thereafter, information recorded when a block is recognized as an unrecorded area is referenced and retry is performed. Therefore, unnecessary retry will not be performed.

According to the present embodiment, data in an adjoining track will not erroneously be transferred. Moreover, since the number of retries can be decreased, the reliability of read data is improved and reading is speeded up.

The present embodiment is adapted to optical disks including a BD. The present embodiment is also adaptable to a DVD-RW disk or any other disk in which address information (wobble signal) is hard to read from an unrecorded area.

What is claimed is:

1. An information reproducing apparatus that reproduces information from an optical disk and transfers the information to an upper-level system, comprising:
    a spindle motor to rotate the optical disk;
    a pickup to irradiate a laser light to the optical disk so as to reproduce information from the optical disk;
    a reproduction circuit to reproduce information from the optical disk based on a reproduction signal read from the pickup;
    a servo circuit to control the rotation of the spindle motor and the movement of the pickup; and
    a microprocessor arranged to control reproduction performed by the pickup, via the reproduction circuit and the servo circuit, and control transfer of information reproduced from the optical disk to an upper-level system,
    wherein the microprocessor comprises:
        an unrecorded area decision unit to decide, based on an amplitude of the reproduction signal whether a block is a recorded area or an unrecorded area;
        a track-off detection unit to monitor a tracking servo signal sent from the servo circuit and detect an occurrence of a tracking failure; and
        a track-off block memory unit to record positional information on a block which the track-off detection unit has recognized as an area where a tracking failure has occurred;
    wherein, if a block is an unrecorded area and recognized as an area where a tracking failure has occurred, reproduction is ceased but data indicating that the block is an unrecorded area is not transferred to the upper-level system and retry is performed in order to achieve reproduction; and wherein, if a block is an unrecorded area and recognized as an area where a tracking failure has not occurred, data indicating that the block is an unrecorded area which is recognized as an area where tracking failure has not occurred is transferred to the upper-level system, and reproduction of data is continued over a range requested from the upper-level system, wherein the range includes the block of the unrecorded area which is recognized as the area where a tracking failure has not occurred corresponding to the data transferred to the upper-level system.

2. The information reproducing apparatus according to claim 1, wherein, if the track-off detection unit detects a tracking failure, information on a block where the tracking failure has occurred is recorded in the track-off block memory unit and reproduction is continued.

3. The information reproducing apparatus according to claim 1, wherein, when a block is a recorded area, and if an address read from reproduced data agrees with an intended address, the reproduced data is transferred to the upper-level system irrespective of information on the block recognized as an area where a tracking failure has occurred which is recorded in the track-off block memory unit.

4. An information reproducing method for reproducing information from an optical disk and transferring the information to an upper-level system, comprising:
  monitoring a tracking servo signal during reproduction of information from the optical disk, and registering a block, which is recognized as an area where a tracking failure has occurred, in a track-off block memory unit;
  deciding, based on an amplitude of a reproduction signal, whether the block is a recorded area or an unrecorded area;
  if the block is an unrecorded area, referring the track-off block memory unit;
  if the block is recognized as an area where a tracking failure has occurred, ceasing reproduction of information from the optical disk, and performing retry to achieve reproduction without transfer of data, which indicates that the block is an unrecorded area, to the upper-level system; and
  if the block is recognized as an area where a tracking failure has not occurred, transferring data, which indicates that the block is an unrecorded area, to the upper-level system, and continuing reproduction of data over a range requested from the upper-level system, wherein the range includes the block of the unrecorded area which is recognized as the area where a tracking failure has not occurred corresponding to the data transferred to the upper-level system.

5. The information reproducing method according to claim 4, wherein, if an occurrence of a tracking failure is recognized, information on a block recognized as an area where the tracking failure has occurred is recorded in the track-off block memory unit and reproduction is continued.

6. The information reproducing method according to claim 4, wherein, when the block is a recorded area, address information read from reproduced data is determined as correct, and when the address read from the reproduced data is correct, the reproduced data is transferred to the upper-level system irrespective of information on the block recognized as an area where a tracking failure has occurred which is recorded in the track-off block memory unit.

7. A method for reproducing information from an optical disk and transferring the information to an upper-level system, the method comprising:
  determining whether a tracking failure has occurred, based on a tracking servo signal, in response to a request to reproduce information from the optical disk;
  when the tracking failure has occurred, recording information on a block recognized as an area where a track failure has occurred in a track-off block memory, and completing reproduction of information from the block;
  determining whether the block is recognized as an unrecorded area, based on amplitude of a reproduction signal;
  when the block is recognized as an unrecorded area, producing data indicating that data is left unrecorded, and suspending the transfer of data to the upper-level system;
  determining whether the block is an area where a tracking failure has occurred, with reference to the track-off block memory;
  if the block is an unrecorded area and recognized as an area where a tracking failure has occurred, ceasing reproduction of information from the optical disk and performing retry to achieve reproduction without transfer of data indicating that the block is an unrecorded area to the upper-level system; and
  if the block is an unrecorded area and recognized as an area where a tracking failure has not occurred, transferring data indicating that the block is an unrecorded area to the upper-level system, and continuing reproduction of data over a range requested from the upper-level system, wherein the range includes the block of the unrecorded area which is recognized as the area where a tracking failure has not occurred corresponding to the data transferred to the upper-level system.

8. The method according to claim 7, further comprising:
  if the block is a recorded area, determining whether address information read from reproduced data is correct; and
  if the address information read from the reproduced data is correct, transferring the reproduced data read from the block to the upper-level system.

* * * * *